United States Patent
Levesque et al.

(10) Patent No.: US 9,965,034 B2
(45) Date of Patent: May 8, 2018

(54) SYSTEMS AND METHODS FOR A HAPTICALLY-ENABLED PROJECTED USER INTERFACE

(71) Applicant: Immersion Corporation, San Jose, CA (US)

(72) Inventors: Vincent Levesque, Montreal (CA); Ali Modarres, San Jose, CA (US); Amaya B. Weddle, San Jose, CA (US); David M. Birnbaum, Oakland, CA (US)

(73) Assignee: Immersion Corporation, San Jose, CA (US)

( * ) Notice: Subject to any disclaimer, the term of this patent is extended or adjusted under 35 U.S.C. 154(b) by 252 days.

(21) Appl. No.: 14/143,675

(22) Filed: Dec. 30, 2013

(65) Prior Publication Data

US 2015/0185841 A1  Jul. 2, 2015

(51) Int. Cl.
*G06F 3/01* (2006.01)
*G06F 3/0484* (2013.01)
*G06F 1/16* (2006.01)
*G06F 3/0481* (2013.01)
*G06F 3/0488* (2013.01)
*G06F 3/0482* (2013.01)

(52) U.S. Cl.
CPC ........... *G06F 3/016* (2013.01); *G06F 1/1639* (2013.01); *G06F 3/04842* (2013.01); *G06F 3/017* (2013.01); *G06F 3/0481* (2013.01); *G06F 3/0482* (2013.01); *G06F 3/0488* (2013.01); *G06F 3/04883* (2013.01)

(58) Field of Classification Search
USPC .......................... 715/701, 702, 726, 863, 864
See application file for complete search history.

(56) References Cited

U.S. PATENT DOCUMENTS 6,703,924 B2    3/2004  Tecu et al.
8,593,409 B1 *  11/2013 Heubel ............... G06F 3/041
                                                340/407.1

(Continued)

FOREIGN PATENT DOCUMENTS

EP    2 144 448     1/2010
JP    2007-295375   11/2007

OTHER PUBLICATIONS

Keyan Liu et al., Virtual assembly with physical information, Emerald Group Publishing Limited, Apr. 21, 2015, vol. 35. No. 3, pp. 206-220.*

(Continued)

*Primary Examiner* — Tam Tran
(74) *Attorney, Agent, or Firm* — Kilpatrick Townsend & Stockton LLP (57) ABSTRACT

One illustrative system disclosed herein includes a sensor configured to detect a user input associated with a projected user interface and transmit a sensor signal associated with the user interaction, and a processor in communication with the sensor, the processor configured to: receive the sensor signal, determine a remote haptic effect based at least in part on the user input, generate a haptic signal based at least in part on the remote haptic effect, and transmit the haptic signal. The illustrative system further includes a haptic output device in communication with the processor, the haptic output device configured to receive the haptic signal and output the remote haptic effect.

22 Claims, 5 Drawing Sheets

(56) References Cited

U.S. PATENT DOCUMENTS

| | | | |
|---|---|---|---|
| 9,274,635 B2 | 3/2016 | Birnbaum | |
| 2005/0030292 A1 | 2/2005 | Diederiks | |
| 2007/0159453 A1* | 7/2007 | Inoue | G06F 1/1616 345/156 |
| 2007/0236450 A1 | 10/2007 | Colgate et al. | |
| 2008/0316183 A1* | 12/2008 | Westerman | G06F 3/0416 345/173 |
| 2009/0096746 A1* | 4/2009 | Kruse | G06F 3/014 345/156 |
| 2010/0085316 A1 | 4/2010 | Kim | |
| 2010/0231367 A1 | 9/2010 | Cruz-Hernandez et al. | |
| 2010/0231508 A1 | 9/2010 | Cruz-Hernandez et al. | |
| 2010/0231539 A1 | 9/2010 | Cruz-Hernandez et al. | |
| 2010/0231540 A1 | 9/2010 | Cruz-Hernandez et al. | |
| 2010/0231541 A1 | 9/2010 | Cruz-Hernandez et al. | |
| 2010/0231550 A1* | 9/2010 | Cruz-Hernandez | G06F 3/0488 345/174 |
| 2011/0012717 A1* | 1/2011 | Pance | G06F 3/016 340/407.2 |
| 2011/0310048 A1* | 12/2011 | B.R | G06F 3/04817 345/173 |
| 2012/0017147 A1 | 1/2012 | Mark | |
| 2012/0274545 A1* | 11/2012 | DeLuca | G06F 3/016 345/156 |
| 2012/0319938 A1* | 12/2012 | Gervais | G06F 3/016 345/156 |
| 2012/0326989 A1* | 12/2012 | Verthein | G06F 3/04847 345/173 |
| 2012/0327006 A1 | 12/2012 | Israr et al. | |
| 2013/0021234 A1 | 1/2013 | Umminger et al. | |
| 2013/0229396 A1 | 9/2013 | Huebner | |
| 2013/0265241 A1* | 10/2013 | Thorn | G06F 3/011 345/173 |
| 2013/0321346 A1* | 12/2013 | Tyler | G06F 3/0488 345/175 |
| 2013/0329183 A1* | 12/2013 | Blum | G02C 11/10 351/158 |
| 2014/0071117 A1* | 3/2014 | Schuckle | G06F 3/016 345/419 |
| 2014/0168170 A1* | 6/2014 | Lazarescu | G06F 3/043 345/177 |
| 2015/0081598 A1* | 3/2015 | Depizzol | G06N 99/005 706/12 |

OTHER PUBLICATIONS

Jin-Hee Lee et al., A wearable guidance system with interactive user interface for persons with visual impairment, Springer Science & Business Media, Nov. 23, 2014, vol. 75, pp. 15275-15296.*

Hoshi, T. et al., Noncontact Tactile Display Based on Radiation Pressure of Airborne Ultrasound, IEEE transaction on Haptics, vol. 3, No. 3, Jul.-Sep. 2010, pp. 155-165.

Iwamoto, T. et al., High Resolution Tactile Display using Acoustic Radiation Pressure, SICE Annual Conference in Sapporo, Aug. 4-6, 2004, pp. 1239-1244.

Kane, S. et al., Bonfire: A Nomadic System for Hybrid Laptop-Tabletop Interaction, UIST'09, Oct. 4-7, 2009, Victoria, British Columbia, Canada, pp. 129-138.

Linder, N. et al., LuminAR: Portable Robotic Augmented Reality Interface Design and Prototype, UIST'10, Oct. 3-6, 2010, New York, NY, pp. 395-396.

Sodhi, R. et al., Aireal: Interactive Tactile Experiences in Free Air, ACM Transactions of Graphics, vol. 32, No. 4, Jul. 2013, 10 pages.

Mistry, P. et al., SixthSense: A Wearable Gestural Interface, SIGGRAPH Asia 2009, Yokohama, Japan, Dec. 16-19, 2009, 1 page.

Willis, K. et al., SideBySide: Ad-hoc Multi-user Interaction with Handheld Projectors, UIST'11, Oct. 16-19, 2011, Santa Barbara, CA, pp. 431-440.

Bau, O. et al., TeslaTouch: Electrovibration for Touch Surfaces, UIST '10 Proceedings of the 23rd annual ACM symposium on User interface software and technology, pp. 283-292, 2010.

Iwamoto, T. et al., High Resolution Tactile Display Using Acoustic Radiation Pressure, SCE Annual Conference in Sapporo, pp. 1239-1244, 2004.

Kane, S. et al., Bonfire: A Nomadic System for Hybrid Laptop-Tabletop Interaction, Proceeding—UIST '09 Proceedings of the 22nd annual ACM symposium on User interface software and technology, pp. 129-138, 2009.

U.S. Appl. No. 14/106,275, filed Dec. 13, 2013, Levesque et al.

U.S. Appl. No. 14/585,752, filed Dec. 30, 2014, Levesque et al.

U.S. Appl. No. 14/275,216, filed May 12, 2014, Levesque et al.

Levesque, V. et al., Exploring the Design Space of Programmable Friction for Scrolling Interactions, 2012 IEEE Haptics Symposium (HAPTICS), pp. 23-30, Mar. 2012.

Linder, N. et al., LuminAR: Portable Robotic Augmented Reality Interface Design and Prototype, Proceeding—UIST '10 Adjunct proceedings of the 23nd annual ACM symposium on User interface software and technology, pp. 395-396, 2010.

Mistry, P. et al., SixthSense: A Wearable Gestural Interface, Proceeding—SIGGRAPH Asia '09 ACM SIGGRAPH Asia 2009 Sketches, Article No. 11, 2009.

Sodhi, R. et al., AIREAL: Interactive Tactile Experiences in Free Air, SIGGRAPH '13, Jul. 21-25, 2013, Anaheim, CA, USA.

Willis, K. et al., SideBySide: Ad-hoc Multi-user Interaction with Handheld Projectors, UIST '11 Proceedings of the 24th annual ACM symposium on User interface software and technology, pp. 431-440, 2011.

Haptic Feedback for Privacy Awareness, Disclosed anonymously.

Haptic Confirmation of User Input for Head-Mounted Displays, Disclosed anonymously.

Haptic Feedback on Head-Mounted Displays, Disclosed anonymously.

European Patent Office, Extended European Search Report, European Application No. 14200449 dated May 7, 2015.

European Patent Office, European Patent Application 14200449.8, official communication dated Jan. 17, 2018, 7 pgs.

* cited by examiner

SYSTEMS AND METHODS FOR A HAPTICALLY-ENABLED PROJECTED USER INTERFACE

FIELD OF THE INVENTION

The present invention relates to the field of user interface devices. More specifically, the present invention relates to methods and apparatuses for providing haptic feedback for projected user interfaces.

BACKGROUND

As computing devices decrease in size to conform with user preferences for portability, so too does available real estate for display screens. With the miniaturization of computing devices and enhancements in projection and sensing technologies, gesture-based interactive systems and projected user interfaces have become increasingly popular. User interfaces can be projected by, for example, a pico projector, onto a surface, allowing users to more easily navigate the user interface than would be possible on a small display screen. For instance, mobile phones may be configured with projection keyboards so that a user can provide input by interacting with a larger projection surface, rather than the small touch-screen display. As another example, a device may project a user interface wherein the user interacts with the device through hand gestures or by displaying other physical objects. While various techniques have been developed in order to simplify navigation through such projected user interfaces, there is a need for a projected user interface to provide haptic feedback.

SUMMARY

Embodiments of the present disclosure comprise devices featuring projected user interfaces that provide haptic feedback. In one embodiment, a system of the present disclosure may comprise a sensor configured to detect a user input associated with a projected user interface and transmit a sensor signal associated with the user interaction, and a processor in communication with the sensor, the processor configured to: receive the sensor signal, determine a remote haptic effect based at least in part on the user input, generate a haptic signal based at least in part on the remote haptic effect, and transmit the haptic signal. The system may further comprise a haptic output device in communication with the processor, the haptic output device configured to receive the haptic signal and output the remote haptic effect.

In another embodiment, a method of the present disclosure may comprise: receiving a sensor signal associated with a user input that is associated with a projected user interface, determining a remote haptic effect based at least in part on the sensor signal, generating a haptic signal based at least in part on the remote haptic effect, and transmitting a haptic signal associated with the remote haptic effect to a haptic output device. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of a Haptically-Enabled

Projected User Interface Device

Figure 1A:
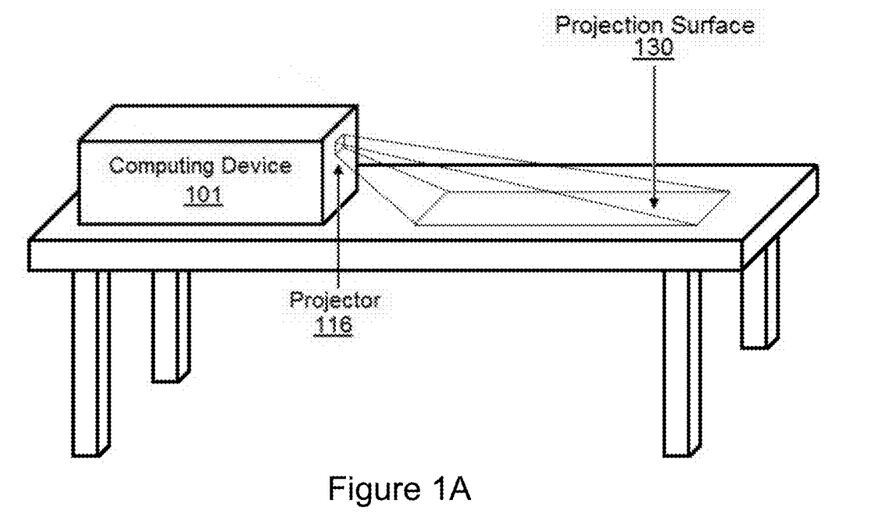
FIG. 1A shows an external view of one embodiment of a system for a haptically-enabled projected user interface.

FIG. 1A shows an external view of one embodiment of a system for a haptically-enabled projected user interface. The embodiment shown includes a computing device 101 that can be used by a user. For example, the computing device 101 may be a handheld device, such as a smartphone, tablet, pocket organizer, GPS receiver, or other handheld device, that has a relatively small keyboard. On such a device, it can be advantageous to utilize a larger external keyboard.

One type of external keyboard that can be utilized with the computing device 101 is a projected virtual keyboard. Such a keyboard is illustrated in FIG. 1A. The computing device 101 comprises a projector 116 that is capable of projecting images onto projection surface 130.

Figure 1B:
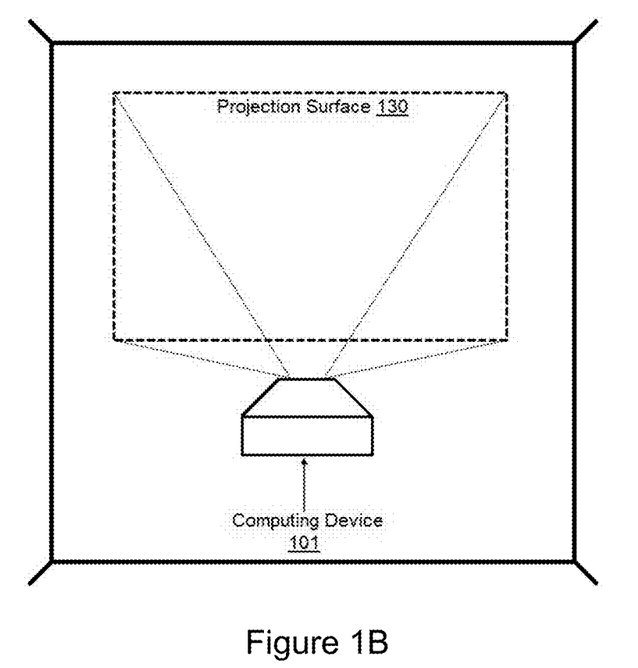
FIG. 1B shows an external view of another embodiment of a system for a haptically-enabled projected user interface.

In FIG. 1A projection surface 130 is the same surface on which the computing device 101 sits. FIG. 1B shows an external view of another embodiment of a system for a haptically-enabled projected user interface. In the embodiment shown in FIG. 1B, the computing 101 device projects the virtual keyboard onto a projection surface 130 on a wall.

Once the virtual keyboard is displayed on the projection surface 130, a user is able to interact with it. The computing device 101 includes one or more sensors (not shown) for detecting the user interactions and providing one or more sensor signals associated with the interactions to a processor in the computing device 101. These interactions may, for example, comprise typing on the keyboard. The processor utilizes the sensor signals associated with these interactions to affect the operation of software executing on the processor.

In the illustrative embodiment, the computing device 101 is also capable of providing haptic feedback to the user. For example, the computing device determines a haptic effect that should be output based on the user's interactions, generates a haptic feedback signal, and transmits the haptic feedback signal to a haptic effect generator (i.e. a "haptic output device") configured to output a haptic effect to the user. In some embodiments, these haptic output devices comprise "remote haptic output devices," which output haptic effects remotely from the computing device 101.

For instance, the projection surface 130 may incorporate a remote haptic output device comprising, for example, an eccentric rotating mass (ERM) motor that is able to impart a vibration on the projection surface 130 such that the user can feel the vibration. In some embodiments, remote haptic output devices may comprise one or more jets configured to emit materials such as solids, liquids, gasses, or plasmas at the user, e.g., at the back of the user's hand, as he or she moves his or her finger across the projection surface 130. In other embodiments, remote haptic output devices may comprise one or more ultrasonic transducers configured to project pressure waves in the direction of the user. These illustrative embodiments are provided merely as examples, and one of skill in the art would understand that various other embodiments of the present invention may be implemented.

As will be discussed in further detail below, remote haptic effects can be used in any number of ways to provide information to a user. Additionally, the presence of a feature in the projection surface can be simulated using effects in addition to or instead of remote haptic effects. Similarly, a remote haptic effect can be output on a surface other than the projection surface.

Illustrative Systems for a Haptically-Enabled

Projected User Interface Device

Figure 2A:
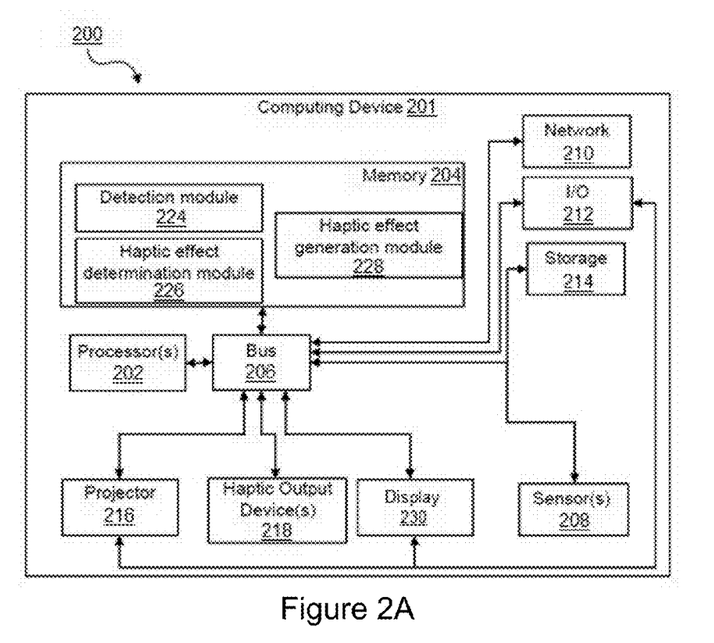
FIG. 2A is a block diagram showing a system for a haptically-enabled projected user interface according to one embodiment.

FIG. 2A is a block diagram showing a system 200 for a haptically-enabled projected user interface according to one embodiment. In this example, system 200 comprises a computing device 201. In some embodiments, computing device 201 may comprise a computer, such as a desktop computer or laptop computer, or handheld devices such as a smartphone, tablet, e-reader, or portable music device. Other embodiments of the present disclosure comprise a computing device 201 within a wearable device, such as a neck tie, watch, glasses, or a ring.

Computing device 201 has a processor 202 interfaced with other hardware via bus 206. A memory 204, which can comprise any suitable tangible (and non-transitory) computer-readable medium such as RAM, ROM, EEPROM, or the like, embodies program components that configure operation of the computing device 201. In this example, computing device 201 further comprises one or more network interface devices 210, input/output (I/O) interface components 212, and additional storage 214.

Network device 210 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 212 may be used to facilitate connection to devices such as one or more displays 230, keyboards, mice, speakers, microphones, and/or other hardware used to input data or output data. Storage 214 represents nonvolatile storage such as magnetic, optical, or other storage media included in device 201.

Projector 216 can represent one or more of any components that facilitate projecting data. For example, projector 216 may be a pico projector (also referred to as "pocket projectors", "mobile projectors", "handheld projectors", or "mini beamers"). By pico projector, it is simply meant a relatively small projector. A pico projector may comprise, for example, a handheld device with an image projector, which may comprise miniaturized hardware and software for projecting digital images. In some embodiments, the projector 216 may project images onto a projection surface. In other embodiments, the projector 216 may project images into space not associated with a surface (for example, as with holograms). In some embodiments, a relatively large projector may be utilized, such as an external projector in communication with the computing device 201. Projector 216 may comprise, for example, digital light processing imagers, beam-steering imagers, or liquid crystal on silicon imagers. Projector 216 may further comprise one or more of liquid crystal display light gates, light emitting diodes, laser diodes, prisms, lamps, dichronic filters, or cathode ray tubes. In some embodiments, projector 216 can project user interfaces that may comprise text, images, buttons, sliders, switches, widgets, or any other features associated with a graphical user interface.

System 200 further comprises one or more sensors 208 configured to detect a user input when a user interacts with an interface, such as a projected interface, and provide appropriate data for use by processor 202. In one embodiment, a user may interact with the projected user interface by moving his or her finger along the projection surface and/or making gestures (e.g., a swipe with his or her hand). Any suitable number, type, or arrangement of sensors can be used to detect user interaction. For example, gyroscopes and accelerometers can be used to detect a change in the orientation or position of the computing device 201, or cameras may be used to detect user input gestures or user interactions with a projection surface. In some embodiments, the processor 202 is in communication with a single sensor 208. In other embodiments, the processor 202 is in communication with a plurality of sensors 208, for example, a gyroscope, an accelerometer, a camera, a depth sensor, and a touch-sensitive surface. In some embodiments, sensor 208 may be configured to detect multiple aspects of the user interaction. For example, sensor 208 may detect the speed and direction of a user interaction, and incorporate this information into the interface signal.

In this example, haptic output device 218 is in communication with processor 202 and embedded within computing device 201. In other embodiments, haptic output device 218 may be remote from computing device 201, but communicatively coupled to processor 202. In some embodiments, haptic output device 218 is configured to output a haptic effect to the user or the projection surface in response to a haptic signal. Some haptic effects may utilize an actuator coupled to a housing of the device, and some haptic effects may use multiple actuators in sequence and/or in concert. For example, in some embodiments, haptic output device 218 may output a haptic effect by vibrating the projection surface at different frequencies. In such an embodiment, haptic output device 218 may comprise one or more of, for example, a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA). In other embodiments, haptic output device 218 may use a plurality of ultrasonic transducers to emit a concentrated pressure wave to vibrate the projection surface.

In some embodiments, haptic output device 218 may use conductors, heaters, liquids, or gasses to produce thermal haptic effects, such as heating or cooling the projection surface. In other embodiments, haptic output device 218 may comprise, for example, speakers or jets that emit materials such as solids, liquids, gasses, or plasmas and may remotely project haptic effects from the computing device 201 to the user or projection surface. Further, in some embodiments, haptic output device 218 may comprise conductors for providing electrotactile stimulation by passing current directly to a user's fingers. Although a single haptic output device 218 is shown here, embodiments may use multiple haptic output devices of the same or different type to provide haptic feedback. For example, in some embodiments, multiple ERMs and gas jets can be used alone or in concert to provide different haptic effects.

In still other embodiments, haptic output device 218 may use electrostatic attraction, for example by use of an electrostatic surface actuator, to simulate a texture on the projection surface 130 or to vary the coefficient of friction the user feels when moving his or her finger across the projection surface. Furthermore, in some embodiments, an electrostatic actuator may be used in conjunction with other haptic output devices 218 to output a remote haptic effect. For example, an array of ultrasonic transducers may emit a concentrated pressure wave to vibrate the projection surface or a portion of the user's body, while another haptic output device such as an electrostatic actuator simulates a texture on the projection surface.

Turning to memory 204, illustrative program components 224, 226, and 228 are depicted to show how a device can be configured in some embodiments to enable haptic feedback for a projected user interface. In this example, a detection module 224 configures processor 202 to monitor the projection surface via sensor 208 to detect a user interaction. For example, module 224 may sample sensor 208 in order to track the presence or absence of a user input and, if an input is present, to track one or more of the location, path, velocity, acceleration, and/or other characteristics of the input over time.

Haptic effect determination module 226 represents a program component that analyzes data regarding user interactions to select a remote haptic effect to generate. Particularly, module 226 may comprise code that determines, based on the location of the input, a remote haptic effect to output and code that selects one or more remote haptic effects to output. For example, some or all of the area of the projection surface may be mapped to a graphical user interface shown on display 230. In some embodiments, the remote haptic effects may simulate the presence of a feature when the projector 216 and/or display 230 outputs a corresponding visual representation of the feature. However, haptic output device(s) 218 may output remote haptic effects even if a corresponding element is not displayed by projector 216 and/or display 230 (e.g., a haptic effect may be provided if a boundary in the interface is crossed, even if the boundary is not displayed visually).

In other embodiments, the haptic effect determination module 226 may base its remote haptic effect determination on one or more of the characteristics of the projection surface (e.g., how the surface reacts to vibrations at different frequencies, the contents of the projection surface, or the topology of the projection surface), a distance between the computing device 201 and the user, or the strength of the remote haptic effect required to be felt by the user. For example, in one such embodiment, the processor 202 may determine the approximate fundamental or normal frequency of the projection surface and use that data in part to determine the remote haptic effect. In one such embodiment, the computing device 201 comprises an accelerometer in communication with processor 202. Computing device 201 vibrates the projection surface and, based on the accelerometer signals, the processor 202 determines an approximate fundamental or normal frequency of the projection surface. Based in part on this data, the processor 202 determines the characteristics of the remote haptic effect.

In another embodiment, the computing device 201 may comprise a camera, range sensor, or other sensor in communication with the processor 202. In some embodiments, based on a camera, range sensor, or other sensor signal, the processor 202 may determine that the projection surface comprises one or more materials. For example, in one embodiment, the processor 202 may determine that the projection surface comprises wood. In some embodiments, the processor 202 may determine the characteristics of the remote haptic effect to insure consistency across projection surfaces comprising different materials. For example, the processor 202 may alter the strength remote haptic effect (e.g. a vibration) if the projection surface comprises wood so that the user perceives a substantially similar haptic effect as if the projection surface comprised laminate.

In another embodiment, based on a camera or other sensor signal, the processor 202 may determine that the projection surface comprises a certain set of characters (e.g. "vibrate intensely"), logos, advertisements, products, or other information. Based in part on this data, the processor 202 may determine the characteristics of the remote haptic effect. For example, in one embodiment, the processor 202 may determine the projection surface comprises the Immersion logo. In such an embodiment, the processor 202 may determine a remote haptic effect associated with Immersion's logo, for example, a set of pulsed vibrations.

In some embodiments, based on a camera, depth sensor, range sensor, or other sensor signal, the processor 202 may determine the topology of the projection surface. Processor 202 may determine the characteristics of the remote haptic effect based on the determined topology. For example, in one embodiment, the processor 202 may determine that the topology of the projection surface comprises a series of bumps. In such an embodiment, the processor 202 may determine a remote haptic effect based in part on the series of bumps. For example, the processor 202 may determine a remote haptic effect that vibrates the projection surface so the series of bumps isn't as perceivable to the user.

In another embodiment, based on a camera, depth sensor, range sensor, or other sensor signal, the processor 202 may determine the distance between the computing device 201 and the user. Based in part on this data, the processor 202 may determine the characteristics of the remote haptic effect. For example, in such an embodiment, if the distance between the computing device 201 and the user is large, the module 226 may determine that the appropriate remote haptic effect may be more intense than if the distance between the computing device 201 and the user is small.

Haptic effect generation module 228 represents programming that causes processor 202 to generate and transmit a haptic signal to haptic output device 218 to generate the selected remote haptic effect. For example, generation module 228 may access stored waveforms or commands to send to haptic output device 218. As another example, haptic effect generation module 228 may utilize signal processing algorithms to generate an appropriate signal to send to haptic output device 218. As a further example, processor 202 may determine a desired remote haptic effect along with target coordinates for the remote haptic effect. Haptic effect generation module 228 may send an appropriate waveform to one or more haptic output devices to generate the appropriate remote haptic effect at the designated coordinates, for example, a location on the projection surface. Some embodiments may utilize multiple haptic output devices in concert to simulate a feature. For instance, in one such embodiment, an array of ultrasonic transducers may emit a concentrated pressure wave causing a portion of the projection surface to vibrate to simulate crossing a boundary between buttons on an interface.

Figure 2B:
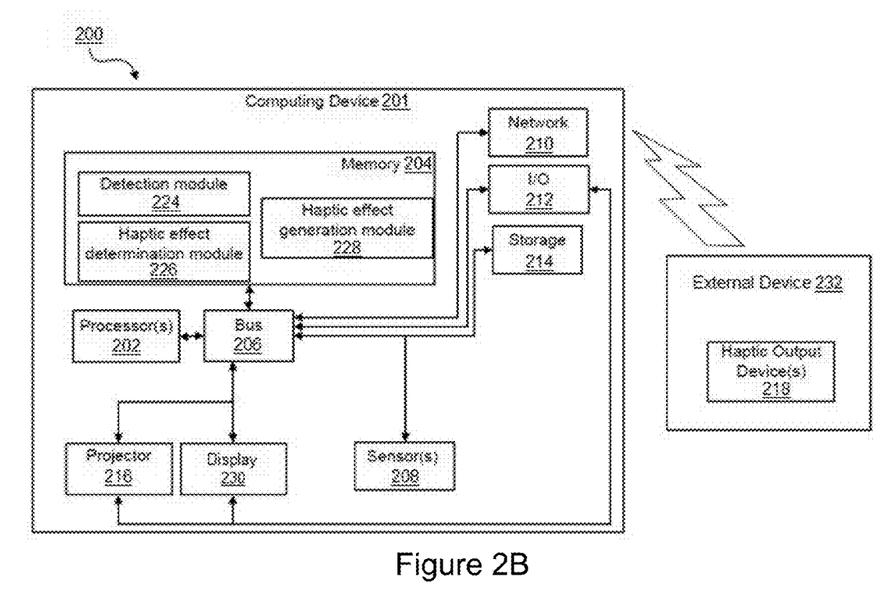
FIG. 2B is a block diagram showing another embodiment of a system for a haptically-enabled projected user interface.

FIG. 2B is a block diagram showing another embodiment of a system 200 for a haptically-enabled projected user interface. In this example, system 200 comprises external device 232. External device 232 comprises a haptic output device 218. In some embodiments, external device is 232 is remote from computing device 201. In some embodiments, external device 232 is in communication with computing device 201 via a wired or wireless link. When the user interacts with the projected user interface by, for example, making a gesture, the haptic output device 218 may provide a remote haptic effect to the user. For example, in one such embodiment, external device 232 may comprise a smartphone or a portable music player, either in the user's pocket or on an armband, projecting a user interface. As the user interacts with the projected user interface, computing device 201 determines a remote haptic effect associated with the interaction and outputs a corresponding signal to the external device 232, which then outputs the remote haptic effect.

In another embodiment, external device 232 may comprise a wearable device, e.g., a bracelet, watch, neck tie, glasses, or glove. When the user interacts with the projected user interface by, for example, making a gesture, the haptic output device 218 may provide a remote haptic effect to the user via the wearable device. For example, external device 232 may be embedded within a neck tie. As the user interacts with the projection surface, computing device 201 determines a remote haptic effect associated with the interaction and outputs a corresponding signal to the neck tie, which then outputs the remote haptic effect to the user. In some embodiments, the wearable device may further comprise the projector 216. For example, in one embodiment, external device 232 and projector 216 may be embedded within a neck tie. As a user navigates through the world, the projector 216 may project one or more user interfaces. As the user interacts with a projected user interface, the computing device 201 determines a remote haptic effect associated with the interaction and outputs a corresponding signal to the neck tie, which then outputs the remote haptic effect to the user.

As another example, in some embodiments, a user may wear a glove comprising a haptic output device 218 configured to output a remote haptic effect. As the user's finger moves across the a projected user interface (e.g. a user interface projected onto a projection surface or projected as part of a hologram), the computing device 201 determines a remote haptic effect and outputs a corresponding haptic signal to the haptic output device 218 in the glove. The haptic output device 218 then outputs the remote haptic effect to the user's hand. In some embodiments, this remote haptic effect may be configured to simulate a feature in the projected user interface. For example, a feature may comprise an effect configured to simulate pressing a button (e.g., a key on a keyboard), moving a slider, turning a knob, or passing over a barrier.

In other embodiments, the projection surface may comprise haptic output device 218. In such an embodiment, when a user interacts with the projected user interface, haptic output device 218 may provide a remote haptic effect directly to the projection surface. For example, in one embodiment, haptic output device 218 may comprise an ERM for vibrating the projection surface, a conductor for outputting electrotactile stimulation, or a conductor for changing the temperature of the projection surface. As the user interacts with the projection surface, computing device 201 may determine a remote haptic effect associated with the interaction. Computing device 201 may then output a corresponding signal to the haptic output device 218, which outputs the remote haptic effect.

In one such embodiment, haptic output device 218 may comprise a conductor embedded below the projection surface. As the user interacts with the projection surface, computing device 201 determines a remote haptic effect associated with the interaction, such as an increase in temperature. Computing device 201 then outputs a corresponding signal to the haptic output device 218, which outputs the remote haptic effect, increasing the temperature at the projection surface. In another embodiment, haptic output device 218 may comprise an ERM disposed in the bottom or legs of the computing device 201, which rests against the projection surface. As the user interacts with the projection surface, computing device 201 determines a remote haptic effect associated with the interaction, such as a vibration. Computing device 201 then outputs a corresponding signal to the haptic output device 218, which outputs the remote haptic effect by directly vibrating the projection surface. In still another embodiment, haptic output device 218 may comprise a conductor disposed in the bottom or legs of the computing device 201, which contacts the projection surface. As the user interacts with the projection surface, computing device 201 determines a remote haptic effect associated with the interaction, such as an electrotactile effect. Computing device 201 then outputs a corresponding signal to the haptic output device 218, which outputs the remote haptic effect by passing current to the projection surface. In some embodiments, the user may perceive this remote haptic effect, e.g., through a semiconductor or conductor in the projection surface.

Figure 3:
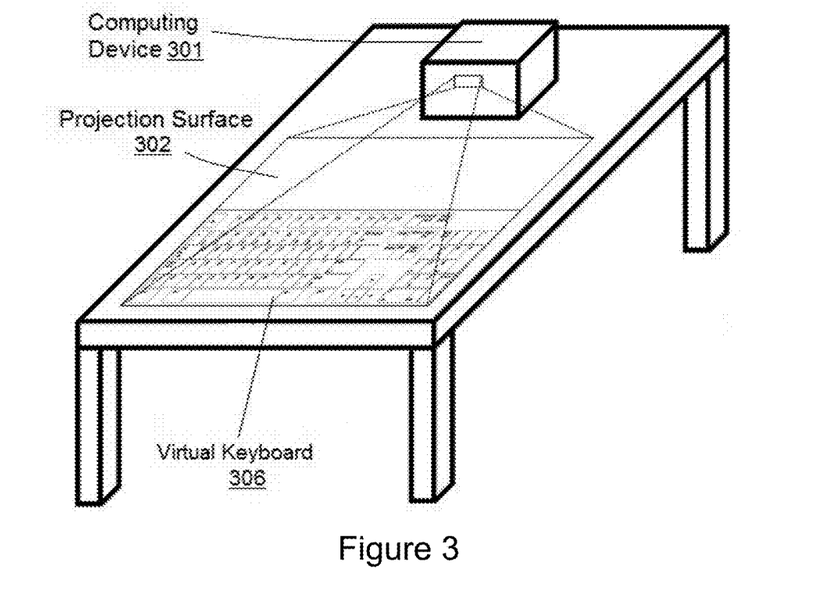
FIG. 3 shows an external view of one embodiment of a system for a haptically-enabled projected user interface.

FIG. 3 shows an external view of one embodiment of a system for a haptically-enabled projected user interface. In some embodiments, computing device 301 may comprise a desktop computer, laptop computer, smartphone, tablet, e-reader, and/or other electronic device. In the embodiment shown in FIG. 3, computing device 301 projects a virtual keyboard 306 onto projection surface 302. In some embodiments, computing device 301 may project a virtual keyboard 306 into an area not associated with a surface, for example, an area associated with a hologram. In one such embodiment, a user may use the projected virtual keyboard 306 to input data. In such an embodiment, as the user interacts with the projected virtual keyboard 306, computing device 301 outputs a remote haptic effect configured to confirm that the user has successfully input a letter.

For example, in one embodiment, computing device 301 comprises a smartphone and projects a large virtual keyboard 306 onto projection surface 302. Rather than inputting text message data using the small virtual keyboard on the smartphone display, the user may instead input text message data by interacting with virtual keyboard 306. In such an embodiment, computing device 301 outputs a remote haptic effect to act as a confirmation that the user entered a letter. In one such embodiment, computing device 301 may output a remote haptic effect by causing a haptic output device directly coupled to projection surface 302 to vibrate when the user successfully inputs a letter. In another embodiment, computing device 301 may vibrate projection surface 302 by emitting a concentrated ultrasonic pressure wave to the projection surface 302 when the user successfully inputs a letter. In yet another such embodiment, computing device 301 may output a remote haptic effect by emitting a stream or puff of gas, for example air, oxygen, carbon dioxide, carbon monoxide, or nitrogen, at the back of the user's finger when the user successfully inputs a letter. In other embodiments, computing device 301 may output a remote haptic effect by emitting a stream of liquid, such as water, or a solid, such as one or more foam balls.

In some embodiments, when the user successfully inputs a letter, computing device 301 may output the vibration directly by vibrating the desktop itself. The user may feel this remote haptic effect through vibrations of the desktop or projection surface 302. In such an embodiment, the characteristics of the effect felt by the user may depend on factors such as the attributes of the vibrations emitted by the computing device 301, the distance between the computing device and the user's finger, and the surface through which the vibrations must travel. Thus, as part of determining the remote haptic effect, the computing device 301 may determine characteristics such as the type of surface (e.g., how the surface reacts to vibrations at different frequencies), the distance to the user, and the strength of vibration required to be felt by the user.

In some such embodiments, computing device 301 may output a haptic signal to a wearable device, such as a neck tie, comprising a haptic output device, which outputs the remote haptic effect when the user successfully inputs a letter. In yet another embodiment, computing device 301 may output a remote haptic effect by changing the temperature of the projection surface 302 when the user successfully inputs a letter. In other embodiments, remote haptic effects may be added to many different types projected user interfaces.

Figure 4:
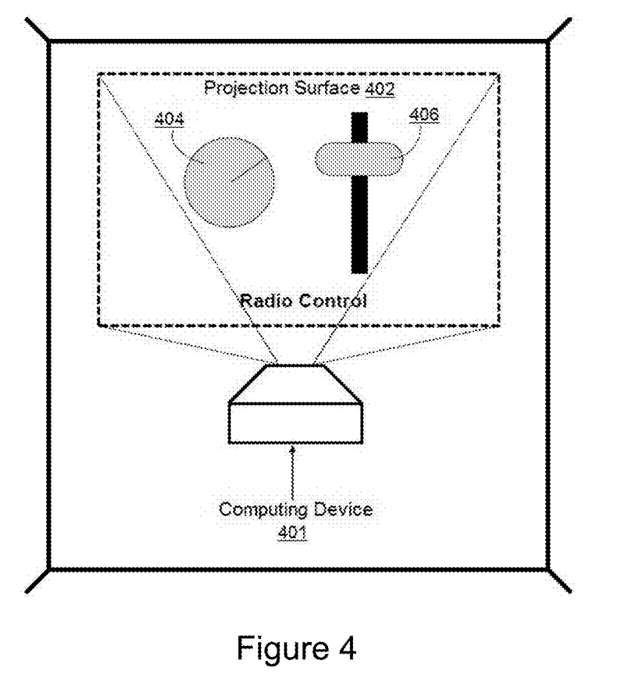
FIG. 4 shows another system for a haptically-enabled projected user interface according to one embodiment.

Turning now to FIG. 4, FIG. 4 shows another system for a haptically-enabled projected user interface according to one embodiment. In one embodiment, computing device 401 may comprise a multifunction controller. For example, a controller for use in a desktop computer, laptop computer, video game system, projected video system, or other type of computing device. In another embodiment, the computing device 401 may comprise a smartphone, tablet, or other type of computer.

In the embodiment shown in FIG. 4, computing device 401 may be configured to control an audio player. As shown in FIG. 4, computing device 401 projects one or more virtual controllers onto projection surface 402. In other embodiments, one or more virtual controllers may be projected into space not associated with a surface (for example, space associated with a hologram). The user may interact with the controllers to control functions of the audio player. For example, in the embodiment shown in FIG. 4, the computing device 401 comprises one or more widgets or virtual interfaces, shown in FIG. 4 as controller 404 and controller 406. Controller 404 comprises an image of a knob configured to control settings of the audio player, for example, a knob to tune to a radio station or select a new song. Similarly, controller 406 comprises an image of a slider configured to adjust another feature of the audio player, such as the volume. In other embodiments, computing device 401 may project a plurality of other virtual controllers, each of the virtual controllers configured to control other aspects of the audio player, such as balance, treble, bass, or other functions commonly associated with music players.

As the user interacts with controllers 404 and 406, the computing device 401 outputs remote haptic effects to confirm receipt of gestures. For example, in one embodiment, computing device 401 may use one or more haptic output devices to output a haptic effect comprising a vibration. In such an embodiment, computing device 401 may select a vibration pattern to communicate information to the user. For example, this vibration pattern may indicate the type of system or device controlled by computing device 401. In one such embodiment, the user may know that one vibration pattern (e.g., long short short) is associated with audio player controls. In such an embodiment, computing device 401 may output this vibration pattern as the user interacts with a projected user interface to control the audio player application.

In a further embodiment, computing device 401 may output additional types of remote haptic effects. For example, in one embodiment, when the user interacts with one of controllers 404 or 406, computing device 401 may output a remote haptic effect configured to confirm detection of the user interaction. In one such embodiment, computing device 401 comprises, for example, a haptic output device such as a jet configured to project a puff of gas (e.g. air) at the user's hand. Thus, as the user interacts with the projected user interface, the puff of gas may confirm that the user is touching a knob.

In another embodiment, computing device 401 may output a different remote haptic effect as the user adjusts the knob. In one such embodiment, computing device 401 may comprise an array of ultrasonic transducers configured to project vibrations at the user or the projection surface 402 as the user interacts with controllers 404 or 406. For example, in one such embodiment, as the user turns controller 404 further to the right, computing device 401 outputs an effect of increasing strength. Similarly, as the user turns controller 404 to the left, computing device 401 outputs an effect that becomes weaker. In some embodiments, such a remote haptic effect may serve as a confirmation that the computing device 401 has received the user input.

In a further embodiment, the user may assign a vibration pattern or other remote haptic effects to various applications or operations controlled by computing device 401. Thus, for example, the user may select a particular vibration pattern or other type of remote haptic effect and associate that remote haptic effect with an application controlled by computing device 401.

As a particular example, in the embodiments described above, the user may be a worker in an office. Computing device 401 projects the audio player controls onto the user's desk. In such an embodiment, a remote haptic effect may enable the user to adjust settings on the audio application without having to focus on the projected interface. For example, a remote haptic effect may allow the user to determine that the computing device 401 received an input, without focusing on the computing device 401. This may enable the user to maintain focus on another device, e.g., the user's desktop computer, while still interacting with the computing device 401. Further, in some embodiments, the haptic feedback may enable the user to interact with a user interface that is not visibly projected. For example, in some embodiments, computing device 401 may detect the user's gestures without visibly displaying the projected user interface.

In some embodiments, computing device 401 may comprise a gaming device for playing video games. In some embodiments, computing device 401 may be a handheld device comprising a projector, for example, a pico projector. Computing device 401 may project video games onto projection surface 406 or into an area not associated with a surface (for example, space associated with a hologram). In some embodiments, a user may interact with computing device 401 by changing its orientation or shaking it or by making gestures (discussed further with regard to FIG. 5). For example, in one embodiment, by tilting computing device 401, a user may cause a projected virtual character to crouch. In another embodiment, by tapping the projection surface 402, a user may cause a virtual character to jump. In some embodiments, in response to a user interaction or based on game events, computing device 401 may output a haptic effect. For example, in one embodiment, a user may cause a virtual character to turn left/right by gesturing his or her finger to the left/right or by tilting computing device 401 to the left/right. In response, in some embodiments, computing device 402 may output haptic effects, such as vibrations, changes in temperature, or puffs of air. In some embodiments, the haptic effects may confirm receipt of a user input or may correspond to a game event, such as a virtual explosion, gun fire, or the terrain across which a virtual character may be passing.

Figure 5:
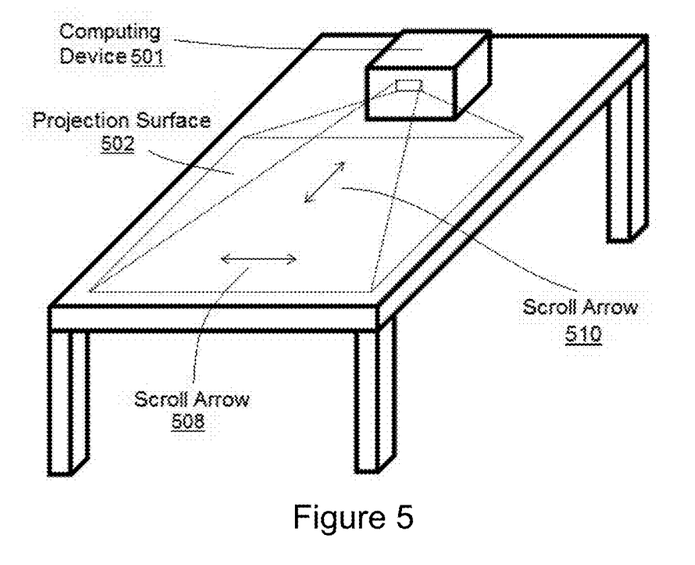
FIG. 5 shows another embodiment of a system for a haptically-enabled projected user interface.

Turning now to FIG. 5, FIG. 5 shows another embodiment of a system for a haptically-enabled projected user interface. As shown in FIG. 5, gestural interactions are represented by scroll arrows 508 and 510. Gestural interactions comprise examples of possible user interaction with the computing device 501. For example, a user may wish to scroll through data, wherein for each line of data that becomes visible on one side of the projection surface 502 another line of data becomes invisible on the opposite side of the projection surface 502. In such an embodiment, scrolling through data left/right 510 or up/down 508 may comprise an interaction wherein the user swipes his or her finger to the left/right or up/down. In one such embodiment, the user may swipe his or her finger to the left/right or up/down across the projection surface 502. In another embodiment, the user may swipe his or her finger to the left/right or up/down in the air, away from the projection surface 502. In other embodiments, computing device 501 may detect other gestures. These may comprise gestures such as a four finger pinch, wherein using four fingers the user makes a pinching gesture, a tap, or a hand wave, which may cause computing device 501 to change programs, or gestures to go back.

In some embodiments, computing device 501 detects each of these gestures. In some such embodiments, computing device 501 may control one or more applications based on the gesture. For example, in one embodiment, computing device 501 may comprise a game system configured to control a game shown on a display (not shown in FIG. 5). As the user interacts with the computing device 501 by gesturing, computing device 501 controls operations associated with the game.

In other embodiments, computing device 501 may output a remote haptic effect to confirm receipt of a gesture. In one such embodiment, computing device 501 may sit on a desktop and project a user interface onto the same desktop. Upon receipt of a gesture input, such as a swipe left/right to scroll left/right, computing device 501 may vibrate the projection surface 502 with a particular pattern or intensity to confirm receipt of the gesture input. For example, in one embodiment, the user may scroll through a photo album. In such an embodiment, as the user swipes left/right to scroll through each picture, the computing device 501 outputs vibrations of varying intensity to confirm receipt of the swipe gesture.

Illustrative Methods for a Enabling Haptic Feedback for a

Projected User Interface

Figure 6:
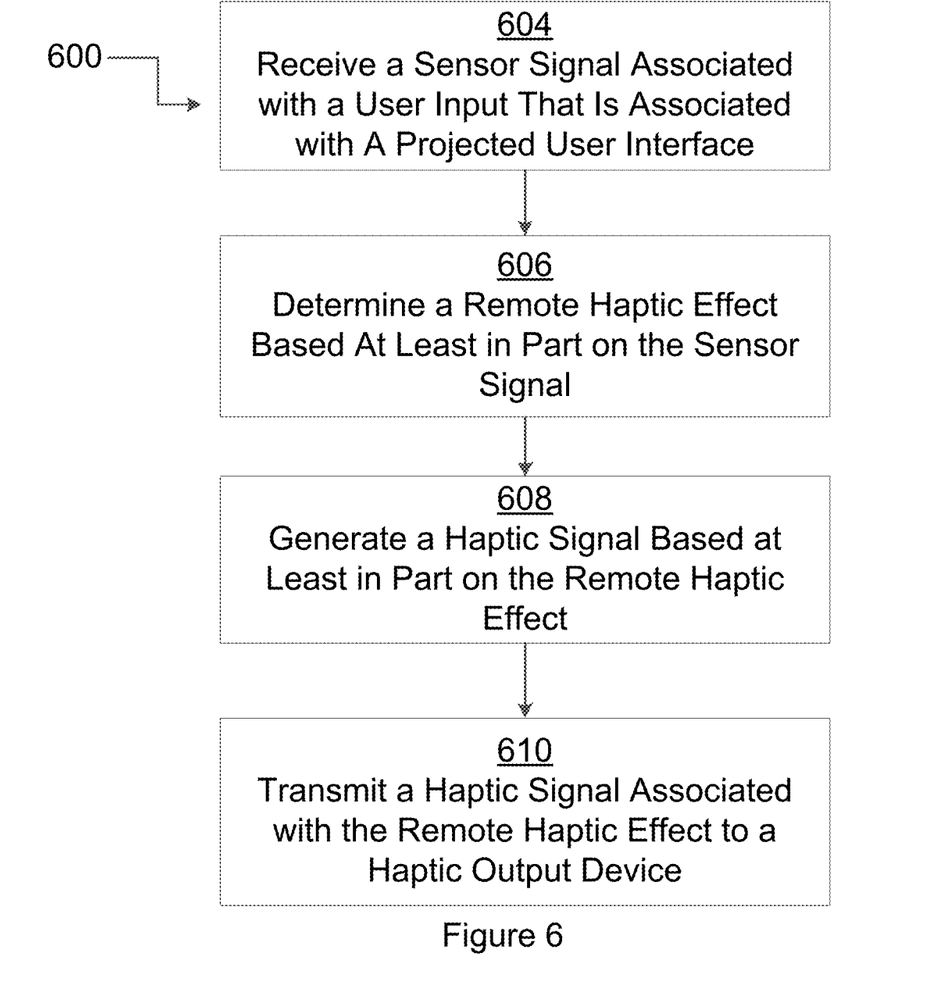
FIG. 6 is a flowchart showing a method for enabling haptic feedback for a projected user interface according to one embodiment.

FIG. 6 is a flowchart showing a method 600 for enabling haptic feedback for a projected user interface according to one embodiment. In some embodiments, the steps in FIG. 6 may be implemented in program code that is executed by a processor, for example, the processor in a general purpose computer, a mobile device, or a server. In some embodiments, these steps may be implemented by a group of processors. In some embodiments one or more steps shown in FIG. 6 may be omitted or performed in a different order. Similarly, in some embodiments, additional steps not shown in FIG. 6 may also be performed. The steps below are described with reference to components described above with regard to system 100 and 200 shown in FIGS. 1 and 2, respectively.

The method 600 begins at step 604 processor 202 receives a sensor 208 signal associated with a user input. In some embodiments, the user input may be associated with a projected user interface. Sensor 208 may comprise one or more of a plurality of sensors known in the art, for example, a camera, accelerometer, gyroscope, a depth sensor, or a touch-sensitive surface. Sensor 208 may be configured to determine the location of the input and other information, such as direction and velocity. Upon detecting user input, sensors 208 may send a signal associated with that interaction to processor 202. A user input may comprise, for example, one or more of a gesture, change the orientation of the computing system 201, interaction within a plain detected by sensor 208, or interaction with a projection surface 130. In some embodiments, the sensor signal may comprise data associated with the location, velocity, direction, or force of the user interaction. For example, the sensor signal may indicate how fast the user's finger is moving, how much force the user is exerting on the projection surface 130, or the direction of movement along the projection surface 130.

The method 600 continues at step 606 when processor 202 determines a remote haptic effect based at least in part on the sensor signal. The processor 202 may rely on programming contained in haptic effect determination module 226 to determine the remote haptic effect. For example, in some embodiments, haptic effect determination module 226 may comprise a lookup table with data comprising a plurality of remote haptic effects and a plurality of user inputs. For example, in one embodiment, in response to typing on a projected virtual keyboard, processor 202 may access the lookup table to determine the remote haptic effect.

In another embodiment, features of a projected user interface may be associated with specific remote haptic effects. For example, in one such embodiment, sliding a user's finger over a button may be associated with a particular remote haptic effect. In such an embodiment, in response to a user sliding a finger over a button, the processor 202 determines a remote haptic effect wherein computing device 201 emits a gas puff to stimulate the user's hand. In some embodiments, one or more features of the projected user interface may be associated with one of a plurality of available textures. In such on embodiment, when the user interacts with each of these features, the processor 202 may determine a remote haptic effect configured to simulate one of the textures, for example, a sticky, bumpy, rubbery, or watery texture.

In one embodiment, processor 202 may determine the remote haptic effect based in part on the user input. For example, in one embodiment, the user may input a number via a projected virtual keyboard. In response, processor 202 may determine a remote haptic effect configured to output a haptic effect comprising a vibration with a strength that is inversely proportional to the size of the number.

Further, in some embodiments, users may have "haptic profiles" wherein a user can determine and save in memory 204 a "profile" of remote haptic effects associated with particular events or user interfaces. For example, in one embodiment, a user may select a remote haptic effect to be associated with a virtual button. For example, the user may select a remote haptic effect such as a long vibration, short vibration, patterned vibration, long oxygen puff, short oxygen puff, patterned oxygen puff, water spray, or textures such as bumpy, rubbery, or smooth. In such an embodiment, processor 202 may determine the remote haptic effect based in part on the haptic profile.

In some embodiments, processor 202 may determine one or more haptic output devices from a plurality of available haptic output devices 218 to output the remote haptic effect. For example, in one embodiment, processor 202 may determine a remote haptic effect comprising a water texture. In such an embodiment, processor 202 may further determine which haptic output device 218 to use to output a remote haptic effect comprising a water texture. Processor 202 may select one or more haptic output devices, such as a jet that emits air and an ESF actuator coupled to the projection surface 130, that alone or in combination can output a remote haptic effect comprising a water texture.

In some embodiments, processor 202 may determine which haptic output device 218 to use to output the remote haptic effect based on a lookup table, an algorithm, a default selection, an input received from a user, or which haptic output devices are not currently in use. For example, in one such embodiment, processor 202 may determine which haptic output device 218 to use to output the remote haptic effect based in part on a lookup table. The lookup table may comprise data with a plurality of haptic output devices and a plurality of haptic effects. For example, the lookup table may comprise data with a gas jet and a plurality of haptic effects, such as a stream of oxygen, a puff of oxygen, or a stream of nitrogen. In such an embodiment, processor 202 may access the lookup table and associate a haptic effect comprising a puff of oxygen with the gas jet.

In another such embodiment, processor 202 may make its determination based in part on a default haptic output device 118. For example, in such an embodiment, processor 202 may, by default, select a gas jet to output a remote haptic effect unless it determines another haptic output device 118 is more appropriate, for example, based in part on a lookup table, an algorithm, or a user input. In another such embodiment, processor 202 may determine the haptic output device 118 based in part on a determination of which haptic output devices 118 are not already in use. For example, in one such embodiment, processor 202 may determine a remote haptic effect comprising a water texture. Processor 202 may further determine that the remote haptic effect can be generated from a haptic output device 218 comprising an ESF actuator or a haptic output device 218 comprising an air jet. In such an embodiment, the haptic output device 218 comprising an ESF actuator may already be being used to generate a different remote haptic effect, such as a simulated increase in the coefficient of friction on the projection surface 130. Processor 202 may thus determine the haptic output device 118 comprising the air jet should be used to output the remote haptic effect.

The method continues when processor 202 generates a haptic signal based at least in part on the remote haptic effect 608 and transmits the haptic signal associated with the remote haptic effect to a haptic output device 610. In some embodiments, the processor 202 may generate the haptic signal by accessing drive signals stored in memory 104 and associated with particular remote haptic effects. In one embodiment, processor 202 may generate the haptic signal by accessing a stored algorithm configured to determine a drive signal based on amplitude and frequency parameters. In some embodiments, the haptic signal may comprise data sent to an actuator to be decoded by the actuator. For instance, the actuator may itself respond to commands specifying parameters such as amplitude and frequency.

In some embodiments, haptic output device 218 may comprise devices to remotely project haptic effects such as, for example, ultrasonic transducers, speakers, or jets that emit solids, liquids, gasses, or plasmas. In one such embodiment, haptic output device 218 may comprise a gas jet configured to emit puffs or streams of oxygen, nitrogen, carbon dioxide, or carbon monoxide with varying characteristics upon receipt of the haptic signal. In other embodiments, haptic output device 218 may comprise an array of ultrasonic transducers that may, in response to receiving the haptic signal, emit a concentrated pressure wave causing vibrations with varying characteristics at the projection surface 130 or a user. In some embodiments, haptic output device 218 may comprise traditional actuators such as piezoelectric actuators or electric motors coupled to components within computing device 201. In such an embodiment, haptic output device 218 may directly cause projection surface 130 to vibrate.

Additional Embodiments of Systems for Haptic

Enabled Projected User Interfaces

In some embodiments of the present disclosure, a computing device may output remote haptic effects without any particular purpose other than to entertain, distract, or calm a user. For example, in one embodiment, wallpaper, for example a "Live Wallpaper," may react to a user's touch. As the user touches the Live Wallpaper, the computing device may output remote haptic effects, for example, a vibration. In another embodiment, a projected application may comprise a game wherein the user tries to touch moving squares, which may react to the user's touch, on the projection surface.

In one embodiment, a computing device may comprise a hands free gaming device. In such an embodiment, the computing device may project a game onto a projection surface and a user may interact with the game by making gestures. For example, the user may make a swiping motion to fire a virtual weapon. As the user interacts with the game, the computing device may output remote haptic effects. In one such embodiment, the computing device may use one or more haptic output devices to output a remote haptic effect confirming detection of the user interaction. For example, in one embodiment, the computing device comprises a haptic output device such as a jet configured to project a puff of gas (e.g. air) at the user's hand. As the user makes gestures with his or her hand, the computing device emits a puff of gas to confirm that the it has detected the gesture.

In some embodiments, the projected user interface may comprise an icon that may be configured to control whether or not remote haptic effects will be output. In one such embodiment, this icon may comprise a widget, such as a button, flag, or icon with which the user may interact to turn remote haptic effects on or off. Further, in some embodiments, the user may be able to vary the strength of the haptic effects by setting the icon in a particular location (e.g., by pushing a virtual switch to a certain point or pulling/pushing a virtual flag to a particular location). In some embodiments, a computing device of the present disclosure may be configured to output remote haptic effects when the user interacts with this widget.

In some embodiments, a computing device may alter the projected image or projected user interface based in part on the topography or contents of a projection surface. In some embodiments, the computing device may comprise sensors (e.g. a camera, depth sensor, or range sensor) for determining the topography or contents of the projection surface. In one such embodiment, based in part on a sensor signal, the computing device may determine and project a new image or user interface. For example, in one embodiment, based on a sensor signal, the computing device may determine that the projection surface comprises the Immersion logo. In such an embodiment, the computing device may project a new user interface associated with the Immersion logo onto the projection surface. Further, in some embodiments, the computing device may determine a remote haptic effect based in part on the sensor signal. For example, in one embodiment, the computing device may determine the projection surface comprises the words "INTENSE VIBRATION." In response, in some embodiments, the computing device may output a remote haptic effect comprising an intense vibration.

In some embodiments, a computing device may project a user interface into space not associated with a specific surface, for example, space associated with a hologram. In such embodiments, computing device may comprise sensors for determining user interaction with the projected user interface, for example, a depth sensor, a camera, or a range sensor. In one such embodiment, based in part on a sensor signal, the computing device may determine and output a remote haptic effect. In some embodiments, the computing device may determine and transmit a signal to a wearable device, such as a necktie, which outputs the haptic effect to the user. In other embodiments, the computing device may directly output the remote haptic effect to the user, for example, by a emitting a solid, liquid, gas, plasma, or pressure wave at the user. For example, in one embodiment, as a user interacts with a holographic projected user interface, the computing device may determine the user's finger has passed over a virtual button. In response, in some embodiments, the computing device may determine a remote haptic effect comprising a squirt of water, and output the remote haptic effect to the user.

Advantages of Haptically-Enabled Projected User Interfaces

There are numerous advantages of having haptically-enabled projected user interfaces. Providing haptic feedback as users navigate projected user interfaces may allow the user to make a state determination (e.g., determine the mode a device is in) without having to visually focus on the projection surface. Thus, the user may be able to maintain focus on other tasks. For example, a user may be able to make determinations with regard to available operations on a projected user interface, without having to visually focus on the projection surface. Similarly, a remote haptic effect may serve as a confirmation that an operation is available, has been completed, or is of a certain level of importance.

Further, providing haptic feedback may allow projected switches to replace conventional switches. This may allow projected user interfaces to operate as multifunction controllers. It may further allow projection-based devices to be used in previously unused places. This may reduce costs, and increase overall user satisfaction.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
   a sensor configured to detect an interaction with a projected user interface that is projected onto a surface and transmit a sensor signal associated with the interaction;
   a processor in communication with the sensor;
   a memory device on which instructions executable by the processor are stored to cause the processor to:
     receive the sensor signal;
     determine a characteristic of the surface based at least in part on at least one sensor signal from at least one sensor;
     determine a remote haptic effect based at least in part on the interaction and the characteristic of the surface;
     generate a haptic signal based at least in part on the remote haptic effect; and
     transmit the haptic signal; and
   a haptic output device in communication with the processor and remote from the surface, the haptic output device configured to receive the haptic signal and output the remote haptic effect by projecting an emission comprising at least one of a solid, liquid, gas, plasma, or sound pressure wave outwardly from the haptic output device.

2. The system of claim 1, wherein the sensor comprises one or more of a camera, an accelerometer, a gyroscope, a depth sensor, or a touch-sensitive surface.

3. The system of claim 1, further comprising a projector for generating the projected user interface.

4. The system of claim 1, wherein the haptic output device comprises one or more of an ultrasonic transducer, a speaker, or a jet configured to project the emission outwardly from the haptic output device to create the remote haptic effect.

5. The system of claim 1, wherein the processor and memory device are positioned in a hand-held computing device that comprises a smartphone, tablet, e-reader, or pocket organizer.

6. The system of claim 1, wherein the projected user interface comprises a hidden interface component, and the interaction is associated with the hidden interface component.

7. The system of claim 1, wherein the characteristic comprises a material of the surface.

8. The system of claim 1, wherein the memory device further includes instructions executable by the processor to cause the processor to determine the remote haptic effect based at least in part on a distance between the haptic output device and a body part to which the remote haptic effect is to be applied.

9. The system of claim 1, wherein the characteristic comprises a fundamental frequency of the surface.

10. The system of claim 1, wherein the characteristic comprises a topology of the surface.

11. The system of claim 1, wherein the sensor, the processor, and the haptic output device are disposed within a single device.

12. The system of claim 1, wherein the emission comprises the sound pressure wave and the haptic output device is configured to project the sound pressure wave outwardly to create the remote haptic effect.

13. The system of claim 1, wherein the emission comprises the solid or the liquid and the haptic output device is configured to project the solid or the liquid outwardly to create the remote haptic effect.

14. The system of claim 1, wherein the emission comprises the gas and the haptic output device is configured to project the gas outwardly to create the remote haptic effect.

15. The system of claim 1, wherein the haptic output device is a first haptic output device, the remote haptic effect is a first haptic effect, and further comprising a second haptic output device coupled to the surface and configured to output a second haptic effect.

16. The system of claim 15, wherein the memory device further comprises instructions executable by the processor to cause the processor to:
  determine the second haptic effect based at least in part on the interaction; and
  cause the second haptic output device to output the second haptic effect concurrently with the first haptic output device outputting the first haptic effect.

17. The system of claim 15, wherein the interaction is a first interaction, and wherein the memory device further comprises instructions executable by the processor to cause the processor to:
  determine a haptic effect to output based on a second interaction;
  select a particular haptic-output device from among a group of haptic output devices comprising the first haptic output device and the second haptic output device, wherein the particular haptic-output device is selected from among the group of haptic output devices based on the haptic effect; and
  cause the particular haptic-output device to output the haptic effect.

18. A method comprising:
  receiving, by a processor and from a sensor, a sensor signal associated with an interaction with a projected user interface that is projected onto a surface;
  determining, by the processor, a characteristic of the surface based at least in part on at least one sensor signal from at least one sensor;
  determining, by the processor, a remote haptic effect based at least in part on the interaction and the characteristic of the surface; and
  causing, by the processor, a haptic output device that is positioned remotely from the surface to output the remote haptic effect to a body part by projecting an emission comprising at least one of a solid, liquid, gas, plasma, or sound pressure wave to the body part.

19. The method of claim 18, wherein the sensor comprises one or more of a camera, an accelerometer, a gyroscope, a depth sensor, or a touch-sensitive surface.

20. The method of claim 18, wherein the haptic output device comprises one or more of an ultrasonic transducer, a speaker, or a jet configured to project the emission outwardly from the haptic output device toward the body part.

21. A non-transient computer readable medium comprising program code, which when executed by a processor is configured to cause the processor to:
  receive a sensor signal associated with an interaction with a projected user interface that is projected onto a surface;
  determine a characteristic of the surface based at least in part on at least one sensor signal from at least one sensor;
  determine a remote haptic effect based at least in part on the interaction and the characteristic of the surface;
  generate a haptic signal based at least in part on the remote haptic effect; and
  transmit the haptic signal associated with the remote haptic effect to a haptic output device positioned remotely from the surface, the haptic signal being configured cause the haptic output device to output the remote haptic effect by projecting an emission comprising at least one of a solid, liquid, gas, plasma, or concentrated pressure wave outwardly from the haptic output device.

22. The non-transient computer readable medium of claim 21, wherein the haptic output device comprises one or more of an ultrasonic transducer, a speaker, or a jet configured to project the emission to create the remote haptic effect.

* * * * *